(12) United States Patent
Lissotschenko et al.

(10) Patent No.: US 7,684,119 B2
(45) Date of Patent: Mar. 23, 2010

(54) DEVICE FOR HOMOGENIZING LIGHT

(75) Inventors: Vitalij Lissotschenko, Fröndenberg (DE); Aleksei Mikhailov, Sankt Petersburg (RU); Maxim Darsht, Dortmund (DE); Iouri Mikliaev, Cheljabinsk (RU)

(73) Assignee: LIMO Patentverwaltung GmbH & Co KG, Gerstengrund (DE)

( * ) Notice: Subject to any disclaimer, the term of this patent is extended or adjusted under 35 U.S.C. 154(b) by 0 days.

(21) Appl. No.: 12/110,837

(22) Filed: Apr. 28, 2008

(65) Prior Publication Data

US 2009/0002834 A1    Jan. 1, 2009

Related U.S. Application Data

(63) Continuation of application No. PCT/EP2006/010366, filed on Oct. 27, 2006.

(30) Foreign Application Priority Data

Oct. 27, 2005    (DE) ................. 10 2005 051 749

(51) Int. Cl.
*G02B 27/10* (2006.01)
(52) U.S. Cl. .............. 359/623; 359/599; 359/621; 359/626
(58) Field of Classification Search ........ 359/621, 359/623, 626, 599
See application file for complete search history.

(56) References Cited

U.S. PATENT DOCUMENTS

| 4,420,221 | A | 12/1983 | Sparks |
| 6,239,913 | B1 | 5/2001 | Tanaka |
| 7,085,062 | B2 * | 8/2006 | Hauschild ............. 359/626 |
| 2004/0130790 | A1 | 7/2004 | Sales |
| 2004/0223225 | A1 | 11/2004 | Mikhailov |
| 2005/0018294 | A1 | 1/2005 | Hauschild |

FOREIGN PATENT DOCUMENTS

| CN | 1573418 A | 2/2005 |
| EP | 1489438 A1 | 12/2004 |
| JP | 11038203 A | 2/1999 |
| WO | 03016963 A2 | 2/2003 |

OTHER PUBLICATIONS

International Search Report dated Jan. 29, 2007.
Chinese Office Action dated Jun. 26, 2009.

* cited by examiner

*Primary Examiner*—Joseph Martinez
(74) *Attorney, Agent, or Firm*—Laurence A. Greenberg; Werner H. Stemer; Ralph E. Locher

(57) ABSTRACT

A device for homogenizing light contains at least one optically functional surface through which light to be homogenized can pass and a plurality of concave and convex cylindrical lenses which are disposed in an alternating fashion one next to the other on the at least one optically functional surface. The device further has at least one first embodiment and at least one second embodiment, different from the at least one first embodiment, of transitions between the concave and the convex cylindrical lenses. Wherein the transitions between the concave and the convex cylindrical lenses are configured such that partial beams of the light to be homogenized, which have passed through different embodiments of the transitions between the concave and the convex cylindrical lenses, have an optical path difference with respect to one another, which contributes to the reduction of interference effects in the homogenized light.

10 Claims, 4 Drawing Sheets

DEVICE FOR HOMOGENIZING LIGHT

CROSS-REFERENCE TO RELATED APPLICATIONS

This is a continuation, under 35 U.S.C. §120, of copending international application No. PCT/EP2006/010366, filed Oct. 27, 2006, which designated the United States; this application also claims the priority, under 35 U.S.C. §119, of German patent application No. DE 10 2005 051 749.8, filed Oct. 27, 2005; the prior applications are herewith incorporated by reference in their entirety.

BACKGROUND OF THE INVENTION

Field of the Invention

The present invention relates to a device for homogenizing light that contains at least one optically functional surface through which light to be homogenized can pass and a plurality of concave and convex cylindrical lenses disposed on the at least one optically functional surface in an alternating fashion, one next to another. The device further has transitions which include at least one first embodiment of transitions between the concave and convex cylindrical lenses and at least one second embodiment of transitions between the concave and convex cylindrical lenses being different from the at least one first embodiment.

FIG. 1 schematically shows a device for homogenizing light (see, for example, U.S. Pat. No. 6,239,913 B1) which is known from the prior art and contains a transparent substrate 20 with an optically functional surface 21 provided with lenses, and a planar surface 22 opposite the optically functional surface 21. Concave and convex cylindrical lenses 23, 24 are disposed on the optically functional surface 21 in an alternating fashion. Due to interference effects of light beams which have passed through transitions 25 between the concave and convex cylindrical lenses 23, 24, or through regions adjacent to the transitions 25, this results in an intensity distribution as shown in FIG. 2. It has intensity peaks 26 on the edge which are not acceptable for some applications.

A device of the type mentioned initially is known from the published, European patent application EP 1 489 438 A, corresponding to U.S. Pat. No. 7,085,062. In the device described therein, two substrates are disposed one behind another in the direction of propagation of the light to be homogenized. Both substrates have an optically functional surface with concave and convex cylindrical lenses disposed on it in an alternating fashion, one next to another. At least two groups of convex cylindrical lenses are provided on the first substrate, with the convex cylindrical lenses of the first group being wider than the convex cylindrical lenses of the second group. The concave cylindrical lenses arranged there between all have the same width. On the second substrate, all the convex cylindrical lenses have the same width, on the one hand, and all the concave cylindrical lenses also have the same width, on the other hand. As a result of this configuration, the vertex lines of the concave cylindrical lenses of the first substrate are displaced with respect to the vertex lines of the concave cylindrical lenses of the second substrate. In particular, this displacement can have a different magnitude for different concave cylindrical lenses. The effect of this is that light that has passed through a concave cylindrical lens of the first substrate at least partially does not pass through a concave cylindrical lens of the second substrate. Furthermore, light that has passed through two different concave cylindrical lenses of the first substrate at least partially does not pass through mutually equivalent regions of the second substrate. This can result in light, which has passed through the same regions of different concave cylindrical lenses of the first substrate, not being incident at the same locations on a work plane. Such a configuration makes it is possible for intensity peaks in the edge region of a work plane to be reduced in certain circumstances.

BRIEF SUMMARY OF THE INVENTION

It is accordingly an object of the invention to provide a device for homogenizing light that overcomes the above-mentioned disadvantages of the prior art devices of this general type, which can achieve a more even intensity distribution of the homogenized light.

With the foregoing and other objects in view there is provided, in accordance with the invention a device for homogenizing light. The device contains at least one optically functional surface through which the light to be homogenized can pass, a plurality of concave and convex cylindrical lenses disposed on the at least one optically functional surface in an alternating fashion, one next to another, and transitions including at least one first embodiment of transitions between the concave and convex cylindrical lenses and at least one second embodiment of transitions between the concave and convex cylindrical lenses being different from the first embodiment of transitions. The transitions between the concave and convex cylindrical lenses are configured such that partial beams of the light to be homogenized, which have passed through different embodiments of the transitions between the concave and convex cylindrical lenses, have an optical path difference from one another contributing to decreasing interference effects and resulting in homogenized light.

By use of the inventively generated defined optical path difference between partial beams which pass through different transitions, light which passes through the transitions can systematically be superposed such that it no longer contributes, or only contributes to a smaller extent, to the intensity distribution. However, undesired interference effects in accordance with the prior art can thereby largely be avoided.

In accordance with an added feature of the invention, the first and the second embodiment of transitions alternate with one another on the at least one optically functional surface.

In accordance with another feature of the invention, the second embodiment of transitions between the concave and convex cylindrical lenses is steeper than the first embodiment of transitions.

In accordance with a further feature of the invention, the second embodiment of transitions between the concave and convex cylindrical lenses has a larger deviation from a sinusoidal form than the first embodiment of transitions.

In accordance with an additional feature of the invention, in a direction of propagation of the light to be homogenized, an extent of the second embodiment of transitions between the concave and convex cylindrical lenses is greater than an extent of the first embodiment of transitions. Wherein in the direction of propagation of the light to be homogenized, a difference ΔH between the extent of the second embodiment of transitions and the extent of the first embodiment of transitions at a wavelength $\lambda$ of the light to be homogenized is chosen in accordance with formula:

$$\Delta H = H_2 - H_1 = \frac{\lambda/2}{n-1}.$$

wherein n is a refractive index of material in which an optically functional interface is configured, $H_2$ is the extent of the second embodiment of transitions and $H_1$ is the extent of the first embodiment of transitions.

In accordance with a further added feature of the invention, the transitions between the concave and convex cylindrical lenses are configured such that both the second embodiment of transitions and the first embodiment of transitions can generate intensity peaks in a far field of the light to be homogenized, wherein, however, the intensity peaks are displaced with respect to one another in an intensity distribution of the far field, so that a homogeneous intensity distribution can be created.

In accordance with a concomitant feature of the invention, the transitions between the concave and convex cylindrical lenses are configured such that an optical path difference of partial beams of the light to be homogenized, which have passed through different embodiments of the transitions between the concave and convex cylindrical lenses, corresponds to approximately one half wavelength or an odd multiple of a half wavelength of the light to be homogenized.

Other features which are considered as characteristic for the invention are set forth in the appended claims.

Although the invention is illustrated and described herein as embodied in a device for homogenizing light, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
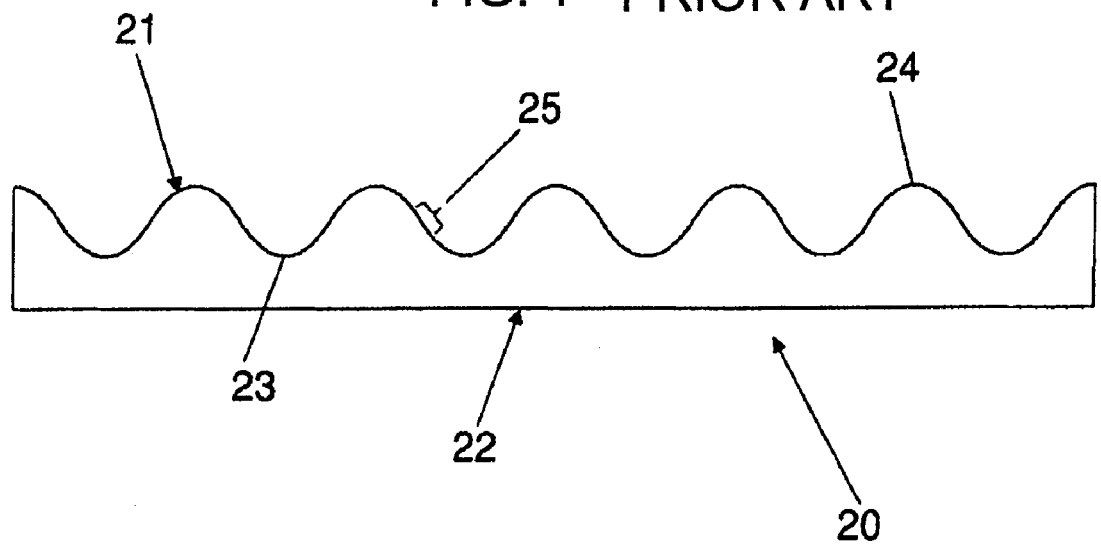
FIG. 1 is a schematic illustration of a device for homogenizing light in accordance with the prior art.
Figure 2:
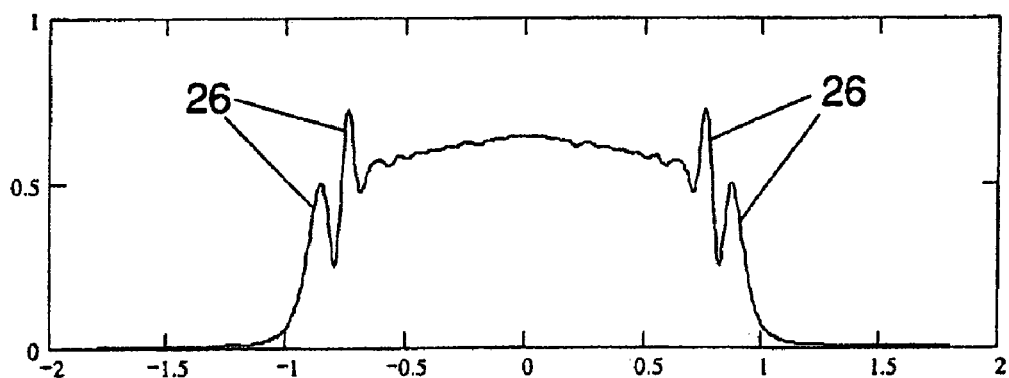
FIG. 2 is a diagram showing an intensity distribution generated by a device in accordance with FIG. 1 (intensity in arbitrary units against angle in degrees)
Figure 3:
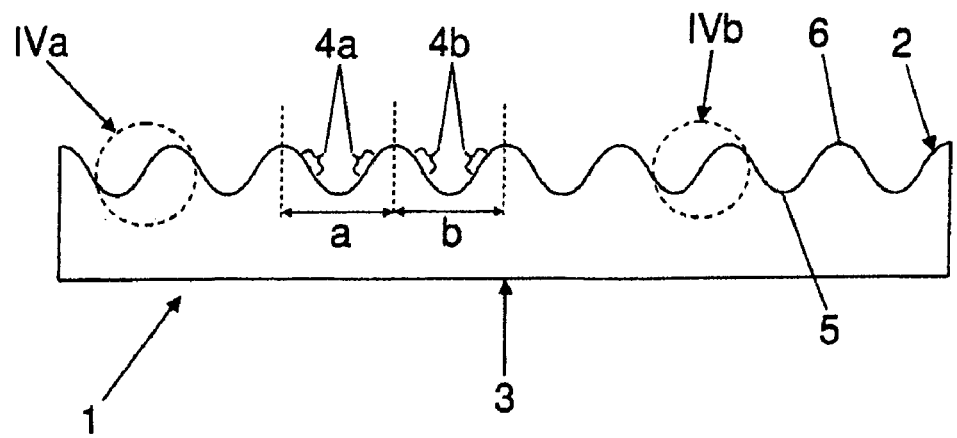
FIG. 3 is a schematic illustration of a device for homogenizing light according to the invention.

Referring now to the figures of the drawing in detail and first, particularly, to FIG. 3 thereof, there is shown an inventive device that contains a substrate 1 with an optically functional surface 2 which has an array of lenses. A planar surface 3 is provided on the opposite side of the substrate 1 in the case of the illustrated embodiment. Concave and convex cylindrical lenses 5, 6 are disposed on the optically functional surface 2 in an alternating fashion. In the case of the device in accordance with FIG. 3, transitions 4a, 4b between the concave and convex cylindrical lenses 5, 6 are configured such that interference effects are decreased. By way of example, the transitions 4b can be steeper and/or have a larger extent in the direction of propagation of the light to be homogenized than the transitions 4a or the transitions 25 known from the prior art (see FIG. 1).

It is possible for both the transitions 4a and the transitions 4b to deviate from a smooth sinusoidal transition. However, the deviation from a sinusoidal transition is larger for the transitions 4b than for the transitions 4a.

It is possible to provide more than one optically functional surface. By way of example, it would be possible to arrange on the rear side of the substrate 1, which has the optically functional surface 2 on its front side, an optically functional surface with concave and convex cylindrical lenses whose cylinder axes are aligned perpendicular to the cylinder axes of the cylindrical lenses arranged on the front side. This substrate thereby contributes to homogenization in two mutually orthogonal directions. Furthermore, it is possible to arrange two or more substrates one behind another in order to increase the homogenization effect, the substrates in each case having one or two optically functional surfaces corresponding to the one in accordance with FIG. 3.

Figures 4A, 4B:
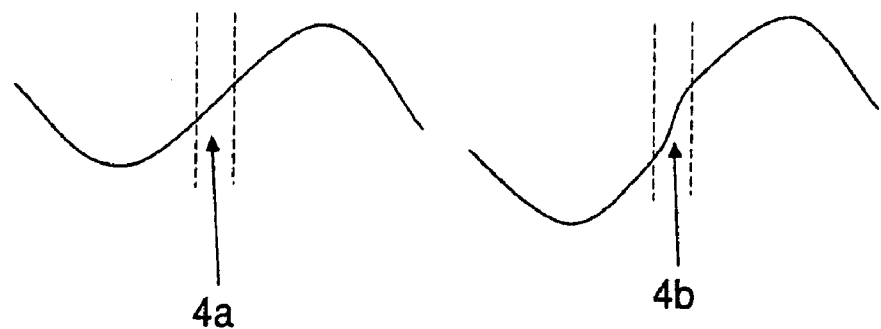
FIG. 4A is a schematic illustration, highly exaggerated view in accordance with the arrow IVa in FIG. 3.
FIG. 4B is a schematic illustration, highly exaggerated view in accordance with the arrow IVb in FIG. 3.

FIG. 3 shows that there are two different groups a, b of sections of the optically functional surface 2, which are arranged on the surface 2 in an alternating fashion. Each element of these groups a, b contains two transitions 4a, 4b between concave and convex cylindrical lenses 5, 6, as well as one concave cylindrical lens 5 and two half convex cylindrical lenses 6. By way of example, the transitions 4a of the first group a can be configured as shown in FIG. 4A. Furthermore, the transitions 4b of the second group b can be configured as shown in FIG. 4B. Hence, in the embodiment in accordance with FIG. 3, similar transitions 4a are arranged to the left and right of a first concave cylindrical lens 5, and similar transitions 4b are arranged to the left and right of a second concave cylindrical lens 6 adjacent to the first concave cylindrical lens 5.

It is to be seen that the transitions 4b extend more in the direction of propagation of the light to be homogenized than the transitions 4a. As a result of this, partial beams of the light to be homogenized which pass through the transitions 4b, for example from the bottom to the top run in FIG. 3, through further within the substrate 1 than do partial beams which pass through the transitions 4a. The greater refractive index of the substrate, which for example is made of glass, compared to the surrounding air results in an optical path difference between the partial beams which passed through the transitions 4b and the partial beams which passed through the transitions 4a. In the case of a preferred embodiment, this path difference can correspond to approximately one half wavelength or an odd multiple of a half wavelength of the light to be homogenized. As a result of this, interference effects of the homogenized light can be reduced. Other path differences are also possible and effective.

Figure 5:
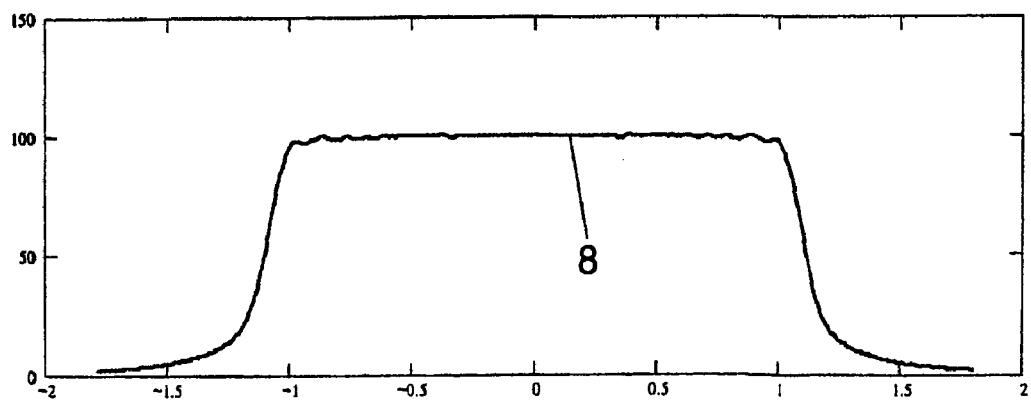
FIG. 5 is a graph showing an intensity distribution generated by the device in accordance with FIG. 3 (intensity in arbitrary units against angle in degrees)
Figure 6:
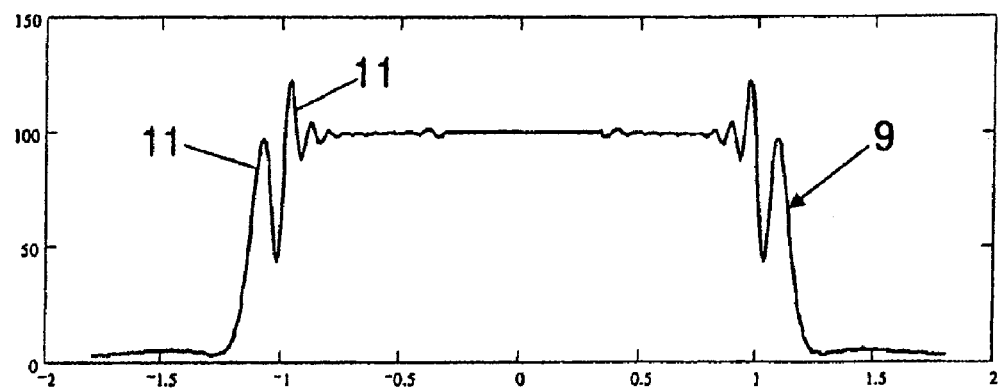
FIG. 6 is a graph showing an intensity distribution generated by a first group (a) of first transitions and subsequent cylindrical lenses of the device in accordance with FIG. 3 (intensity in arbitrary units against angle in degrees)
Figure 7:
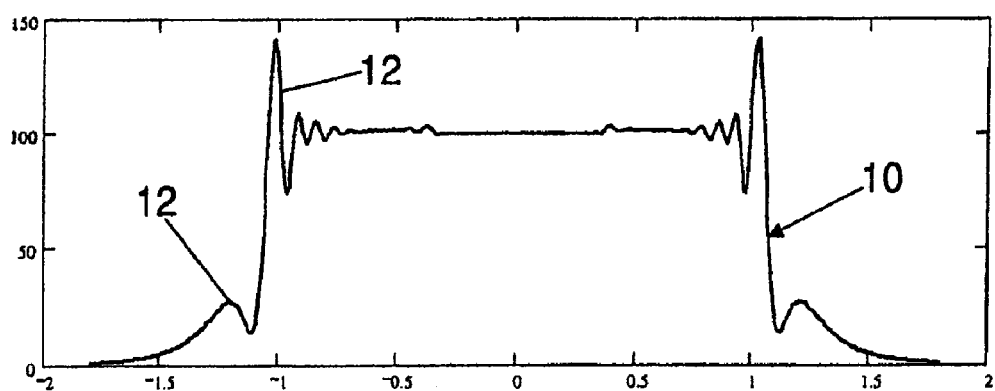
FIG. 7 is a graph showing an intensity distribution generated by a second group (b) of second transitions and subsequent cylindrical lenses of the device in accordance with FIG. 3 (intensity in arbitrary units against angle in degrees)
Figure 8:
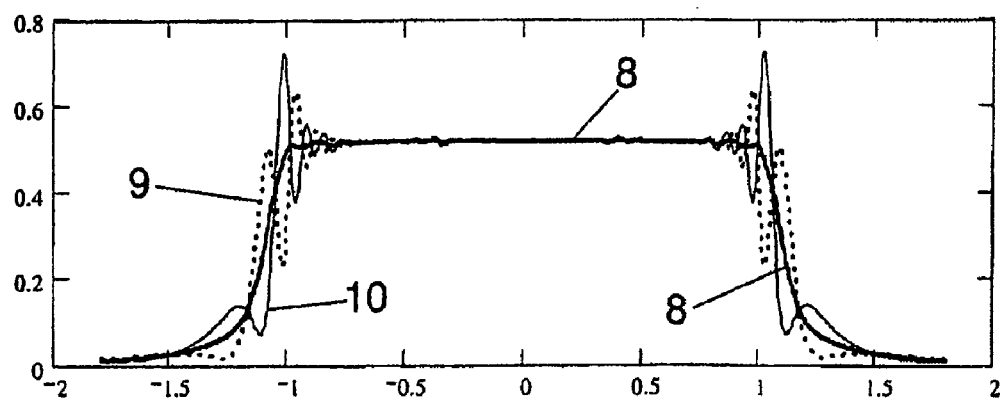
FIG. 8 is a graph showing the superposition of the intensity distributions in accordance with FIG. 6 and FIG. 7 (intensity in arbitrary units against angle in degrees)
Figure 9:
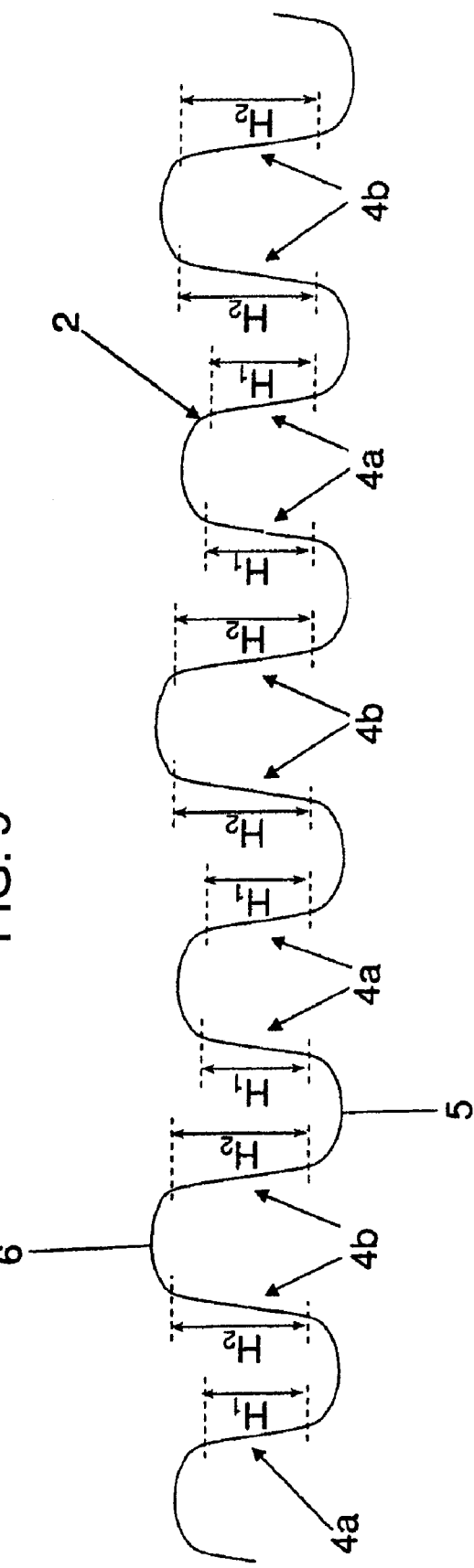
FIG. 9 is a schematic view of an optically functional surface of a further embodiment of an inventive device.

FIG. 5 shows an intensity distribution of light 8 that has passed through a device in accordance with FIG. 3 or FIG. 9. The intensity peaks known from the prior art do not occur here. FIGS. 6 to 8 show how the intensity distribution of the homogenized light 8 to be seen in FIG. 5 and FIG. 8 is created by superposition of the light 9 passing through the group a and the light 10 passing through the group b. Intensity peaks 11, 12 are created both when passing through group a (see FIG. 6) and when passing through group b (see FIG. 7); however, in the case of superposition (see FIG. 8) these peaks cancel out due to interference or are superposed such that a homogeneous intensity distribution is created.

FIG. 9 shows an embodiment in which similar transitions 4a or 4b are arranged not to the left and right of a concave cylindrical lens 5, but to the left and right of a convex cylindrical lens 6. This is not important for the functioning of the device. It is only important that an approximately equal number of transitions 4a between the concave and convex cylindrical lenses 5, 6 in accordance with the first embodiment and transitions 4b in accordance with the second embodiment are provided on the optically functional surface 2.

It is clear from FIG. 9 that in the direction of propagation of the light to be homogenized, the extent $H_2$ of the transition 4b between the concave and convex cylindrical lenses 5, 6 in accordance with the second embodiment is greater than the extent $H_1$ of the transition 4a in accordance with the first embodiment. In this case, given a wavelength λ of the light to be homogenized and a refractive index n of the substrate 1 in which the optically functional interface is configured, the difference ΔH can be chosen such that it corresponds to the following formula:

$$\Delta H = H_2 - H_1 = \frac{\lambda/2}{n-1}.$$

If ΔH corresponds to this formula, the intensity distributions in accordance with FIG. 6 and FIG. 7 are displaced with respect to one another precisely such that in the case of superposition (see FIG. 8), the intensity peaks 11, 12 cancel out due to interference or are superposed such that a homogeneous intensity distribution is created, in particular in the case of small exit angles of the light to be homogenized, measured from the surface normal to the surface 2.

The invention claimed is:

1. A device for homogenizing light, comprising:
   at least one optically functional surface through which the light to be homogenized can pass;
   a plurality of concave and convex cylindrical lenses disposed on said at least one optically functional surface in an alternating fashion, one next to another; and
   transitions including at least one first embodiment of transitions between said concave and convex cylindrical lenses and at least one second embodiment of transitions between said concave and convex cylindrical lenses being different from said first embodiment of transitions, said transitions between said concave and convex cylindrical lenses configured such that partial beams of the light to be homogenized, which have passed through different embodiments of said transitions between said concave and convex cylindrical lenses, have an optical path difference from one another contributing to decreasing interference effects and resulting in homogenized light.

2. The device according to claim 1, wherein said first and said second embodiment of transitions alternate with one another on said at least one optically functional surface.

3. The device according to claim 1, wherein said second embodiment of transitions between said concave and convex cylindrical lenses is steeper than said first embodiment of transitions.

4. The device according to claim 1, wherein said second embodiment of transitions between said concave and convex cylindrical lenses has a larger deviation from a sinusoidal form than said first embodiment of transitions.

5. The device according to claim 1, wherein in a direction of propagation of the light to be homogenized, an extent of said second embodiment of transitions between said concave and convex cylindrical lenses is greater than an extent of said first embodiment of transitions.

6. The device according to claim 5, wherein in the direction of propagation of the light to be homogenized, a difference ΔH between said extent of said second embodiment of transitions and said extent of said first embodiment of transitions at a wavelength λ of the light to be homogenized is chosen in accordance with formula:

$$\Delta H = H_2 - H_1 = \frac{\lambda/2}{n-1}.$$

wherein n is a refractive index of material in which an optically functional interface is configured, $H_2$ is the extent of said second embodiment of transitions and $H_1$ is the extent of said first embodiment of transitions.

7. The device according to claim 1, wherein said transitions between said concave and convex cylindrical lenses are configured such that both said second embodiment of transitions and said first embodiment of transitions can generate intensity peaks in a far field of the light to be homogenized, wherein, however, the intensity peaks are displaced with respect to one another in an intensity distribution of the far field, so that a homogeneous intensity distribution can be created.

8. The device according to claim 1, wherein said transitions between said concave and convex cylindrical lenses are configured such that an optical path difference of partial beams of the light to be homogenized, which have passed through different embodiments of said transitions between said concave and convex cylindrical lenses, corresponds to approximately one half wavelength or an odd multiple of a half wavelength of the light to be homogenized.

9. A device for homogenizing light, comprising:
   at least one optically functional surface through which the light to be homogenized can pass;
   a plurality of concave and convex cylindrical lenses disposed on said at least one optically functional surface in an alternating fashion, one next to another;
   transitions including at least one first embodiment of transitions between said concave and convex cylindrical lenses and at least one second embodiment of transitions between said concave and convex cylindrical lenses being different from said first embodiment of transitions, said transitions between said concave and convex cylindrical lenses configured such that partial beams of the light to be homogenized, which have passed through different embodiments of said transitions between said concave and convex cylindrical lenses, have an optical path difference from one another contributing to decreasing interference effects and resulting in homogenized light;

wherein, in a direction of propagation of the light to be homogenized, an extent of said second embodiment of transitions between said concave and convex cylindrical lenses is greater than an extent of said first embodiment of transitions; and wherein, in the direction of propagation of the light to be homogenized, a difference ΔH between said extent of said second embodiment of transitions and said extent of said first embodiment of transitions at a wavelength λ of the light to be homogenized is chosen in accordance with formula:

$$\Delta H = H_2 - H_1 = \frac{\lambda/2}{n-1}.$$

where n is a refractive index of material in which an optically functional interface is configured, $H_2$ is the extent of said second embodiment of transitions and $H_1$ is the extent of said first embodiment of transitions.

10. A device for homogenizing light, comprising:

at least one optically functional surface through which the light to be homogenized can pass;

a plurality of concave and convex cylindrical lenses disposed on said at least one optically functional surface in an alternating fashion, one next to another;

transitions including at least one first embodiment of transitions between said concave and convex cylindrical lenses and at least one second embodiment of transitions between said concave and convex cylindrical lenses being different from said first embodiment of transitions, said transitions between said concave and convex cylindrical lenses configured such that partial beams of the light to be homogenized, which have passed through different embodiments of said transitions between said concave and convex cylindrical lenses, have an optical path difference from one another contributing to decreasing interference effects and resulting in homogenized light; and wherein said transitions between said concave and convex cylindrical lenses are configured such that an optical path difference of partial beams of the light to be homogenized, which have passed through different embodiments of said transitions between said concave and convex cylindrical lenses, corresponds to approximately one half a wavelength or an odd multiple of a half wavelength of the light to be homogenized.

* * * * *